US008000858B2

(12) United States Patent
Tonegawa et al.

(10) Patent No.: US 8,000,858 B2
(45) Date of Patent: Aug. 16, 2011

(54) VEHICLE MOUNTED WITH AN ELECTRIC STORAGE DEVICE, AND ELECTRIC APPARATUS FOR SUPPLYING AND RECEIVING ELECTRIC POWER TO AND FROM THE VEHICLE

(75) Inventors: Hiromi Tonegawa, Kounan (JP); Masato Ichishi, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 428 days.

(21) Appl. No.: 12/224,165

(22) PCT Filed: Mar. 1, 2007

(86) PCT No.: PCT/JP2007/054499
§ 371 (c)(1), (2), (4) Date: Aug. 20, 2008

(87) PCT Pub. No.: WO2007/105579
PCT Pub. Date: Sep. 20, 2007

(65) Prior Publication Data
US 2009/0043450 A1 Feb. 12, 2009

(30) Foreign Application Priority Data
Mar. 13, 2006 (JP) ................................. 2006-067694

(51) Int. Cl.
*G06F 7/00* (2006.01)
*G05B 19/12* (2006.01)
*B60L 3/00* (2006.01)

(52) U.S. Cl. ............ 701/36; 701/22; 340/5.6; 340/5.65; 191/2

(58) Field of Classification Search .................. 180/287; 191/2; 307/9.1, 10.1, 10.5; 320/106, 109; 340/5.2, 5.6, 5.61–5.67; 701/1, 22, 36; 713/170; 903/903, 907
See application file for complete search history.

(56) References Cited

U.S. PATENT DOCUMENTS

| | | | | |
|---|---|---|---|---|
| 5,202,617 A * | 4/1993 | Nor | ................................ | 320/130 |
| 5,327,066 A * | 7/1994 | Smith | ............................ | 320/109 |
| 5,548,200 A * | 8/1996 | Nor et al. | ........................ | 320/109 |
| 5,600,723 A * | 2/1997 | Woodall et al. | ................ | 713/170 |
| 6,144,112 A * | 11/2000 | Gilmore | ........................ | 307/10.2 |
| 6,672,415 B1 | 1/2004 | Tabata | | |

(Continued)

FOREIGN PATENT DOCUMENTS

DE 195 02 223 A1 8/1996

(Continued)

OTHER PUBLICATIONS

Russian Office Action issued in Russian Patent Application No. 2008140307 on Oct. 26, 2009. (with English translation).

*Primary Examiner* — Thomas G Black
*Assistant Examiner* — Lindsay M Browder
(74) *Attorney, Agent, or Firm* — Oliff & Berridge, PLC (57) ABSTRACT

A charger can read an ID code from a transponder key of an immobilizer system of a contract vehicle. When an owner of the vehicle connects a vehicle and charger with a charging cable and brings the transponder key close to a reading portion, the read ID code is transmitted from charger toward vehicle where authentication is performed. Vehicle transmits an authentication result to charger. Preferably, these transmission and reception can be performed by power line communication employing a vehicle cable.

13 Claims, 4 Drawing Sheets

U.S. PATENT DOCUMENTS

| | | |
|---|---|---|
| 6,865,451 B2 * | 3/2005 | Onoyama et al. ................ 701/2 |
| 6,919,791 B2 * | 7/2005 | Toyomasu et al. ........... 340/5.31 |
| 2004/0079564 A1 | 4/2004 | Tabata |
| 2006/0113129 A1 | 6/2006 | Tabata |

FOREIGN PATENT DOCUMENTS

| | | | |
|---|---|---|---|
| DE | 10304284 | * | 8/2004 |
| EP | 0 877 341 A2 | | 11/1998 |
| JP | A-5-227669 | | 9/1993 |
| JP | A-10-262303 | | 9/1998 |
| JP | A-10-262304 | | 9/1998 |
| JP | A-10-262305 | | 9/1998 |
| JP | A-2001-69610 | | 3/2001 |
| JP | A-2002-140398 | | 5/2002 |
| JP | A-2004-70682 | | 3/2004 |
| RU | 2 191 709 C2 | | 10/2002 |

* cited by examiner

VEHICLE MOUNTED WITH AN ELECTRIC STORAGE DEVICE, AND ELECTRIC APPARATUS FOR SUPPLYING AND RECEIVING ELECTRIC POWER TO AND FROM THE VEHICLE

TECHNICAL FIELD

The present invention relates to a vehicle and an electric apparatus and more specifically to a vehicle mounted with an electric storage device and an electric apparatus for supplying and receiving electric power to and from the vehicle.

BACKGROUND ART

In recent years, as an environmentally-friendly vehicle, an electric car, a hybrid car, a fuel-cell vehicle, and the like mounted with an electric storage device and a motor as a drive device are receiving attention. A hybrid car that can be charged from outside is also considered.

There is a charger, as disclosed in Japanese Patent Laying-Open No. 10-262303, wherein a key of an electric car is in a form of an IC card and the IC card is inserted into the charger to thereby enable battery charging in a vehicle sharing system.

However, in a case of an individually-owned vehicle, the IC card identifying a user of the charger and the key of the vehicle are not necessarily sharable. Moreover, the charger may be shared among a plurality of vehicles in a parking lot of an apartment house. In such a case, it is necessary to reliably identify a vehicle as a vehicle permitted to be charged at the time of charging.

Furthermore, it is preferable to ensure that the vehicle does not start traveling by mistake in starting charging of the vehicle.

DISCLOSURE OF THE INVENTION

It is an object of the invention to provide a vehicle and an electric apparatus that prevent supply and reception of electric power to and from cars other than a target car.

In summary, the invention is a vehicle including: an electric storage device; an electric power converter for supplying and receiving electric power to and from the electric storage device; a connecting portion for connecting an electric apparatus outside the car and the electric power converter; and an electronic control device for reading key information stored in a vehicle key and permitting starting of the vehicle when the key information matches with registration information registered in advance in the vehicle. The electronic control device includes a controller for controlling the electric power converter so that the converter receives the key information from the electric apparatus and supplies and receives the electric power to and from the electric storage device when the key information matches with the registration information.

It is preferable that the vehicle further includes a transmitting portion for transmitting an authentication result to the electric power device when the key information matches with the registration information.

It is preferable that the electronic control device receives the key information via a route different from a power distribution route for supplying and receiving the electric power between the electric apparatus and the electric power converter and prohibits supply or reception of the electric power to and from the electric storage device when the key information matches with the registration information.

It is preferable that the electronic control device receives the key information via a power distribution route for supplying and receiving the electric power between the electric apparatus and the electric power converter and prohibits starting of the vehicle when the key information matches with the registration information.

It is preferable that the registration information is information specific to each vehicle and the electronic control device returns to the electric apparatus permission information indicating that the vehicle is a car permitted to use the electric apparatus when the key information matches with the registration information.

According to another aspect of the invention, there is provided an electric apparatus for supplying and receiving electric power to and from an electric storage device mounted to a vehicle including an electronic control device for reading key information stored in a vehicle key and permitting starting of the vehicle when the key information matches with registration information registered in advance in the vehicle. The electric apparatus includes a reading portion for reading the key information from the vehicle key and an electric power supplying and receiving portion for supplying or receiving the electric power to and from the electric storage device according to the key information read by the reading portion.

It is preferable that the electric apparatus further includes a transmitting portion for transmitting the key information to the vehicle when the reading portion reads the key information and a receiving portion for receiving a signal indicating whether or not the key information matches with the registration information stored in advance in the vehicle from the electronic control device.

More preferably, the electric apparatus further includes a control portion for permitting supply or reception of the electric power to or from the electric storage device when the receiving portion receives the signal indicating that the key information matches with the registration information.

More preferably, the electric apparatus further includes a control portion for storing permission information issued to a car permitted to use the electric apparatus and determining whether or not the information transmitted from the electronic control device matches with the permission information when the key information matches with the registration information registered in advance in the vehicle. The control portion permits supply or reception of the electric power to or from the electric storage device when the information transmitted from the electronic control device matches with the permission information.

More preferably, the electric apparatus further includes a storage device for storing vehicle owner information. The signal includes the vehicle owner information. The control portion permits supply or reception of the electric power to and from the electric storage device when the vehicle owner information stored in the storage device matches with the vehicle owner information included in the signal.

Preferably, the electric apparatus further includes a power line cable for supplying or receiving the electric power to and from the electric storage device. The transmitting portion and the receiving portion transmits and receives the signal to and from the vehicle through the power line cable.

With the invention, supply and reception of the electric power to and from cars other than the target car are prevented and the vehicle can be kept at rest in starting supply and reception of the electric power.

BEST MODES FOR CARRYING OUT THE INVENTION

Embodiments of the present invention will be described specifically below with reference to the drawings. The same or corresponding portions in the drawings will be provided with the same reference numerals and they will not be described repeatedly.

First Embodiment

Figure 1:
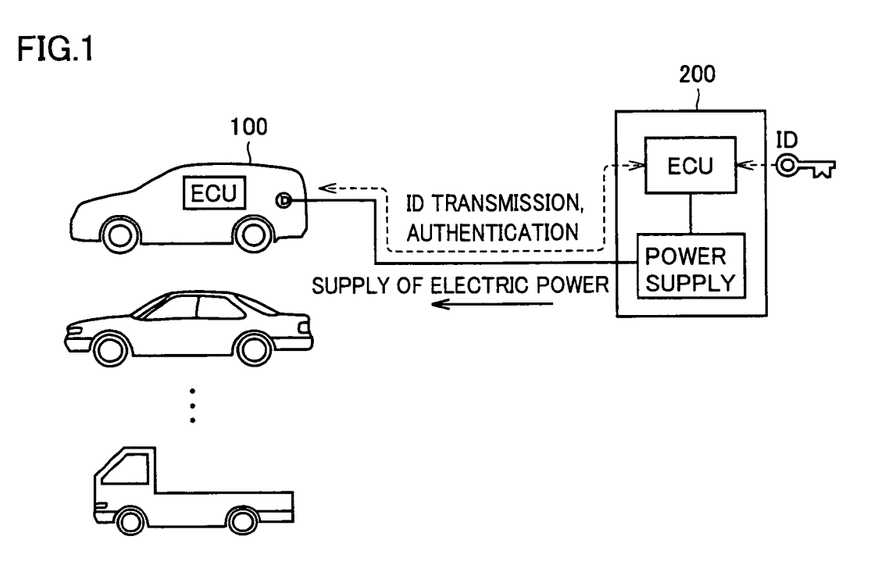
FIG. 1 is a drawing for describing a charger and a vehicle of a first embodiment of the present invention.

FIG. 1 is a drawing for describing a concept of the first embodiment of the invention.

With reference to FIG. 1, a charger 200 is a device installed in a parking lot of an apartment house or a long-term parking lot and can be used for a plurality of registered vehicles. Although the plurality of vehicles are parking in the parking lot of the apartment house and the long-term parking lot, owners of the cars are contractors and can be identified. Charger 200 is shared among the plurality of vehicles. Charger 200 supplies electric power to charge an electric storage device of a vehicle 100 such as an electric car or a hybrid car that can be charged from outside.

Vehicle 100 is mounted with an immobilizer system. The immobilizer system recognizes a transponder key including a transponder with an ID code written to it and permits starting of a starter of the vehicle such as an engine starter.

Charger 200 can read the ID code from the transponder key of the immobilizer system. If the owner of the car connects vehicle 100 and charger 200 with a charging cable and brings the transponder key close to a reading portion, charger 200 transmits the read ID code to vehicle 100 and authentication is performed in vehicle 100. Vehicle 100 transmits an authentication result to charger 200. Those transmission and reception are preferably carried out by power line communication using a vehicle cable.

Charger 200 permits the power cable to start supply of charging electric power when the authentication result is normal. A recognition distance of the transponder key is normally as short as a distance shorter than 1 m. Therefore, the key is distant from a transponder key recognizing portion provided to the vehicle and vehicle cannot be started when the driver causes the charger to start power distribution. In this way, it is possible to prevent the vehicle from moving unexpectedly during charging operation.

It is also possible that charging is permitted after completion of authentication and that a driver operates a charging start switch of the charger into an ON state in the charging permitted state to thereby start charging. Alternatively, charging may be started in response to the "completion of authentication".

In this way, it is possible to force the driver to perform the charging operation in a state where the vehicle key for starting the vehicle is detached from the vehicle, i.e., a state where the vehicle cannot move. In a case where there are two vehicle keys including a spare key and one of the vehicle keys has already been inserted into the vehicle and authenticated, the other key is not authenticated even if it is inserted into the charger. Moreover, in such a case, the charger may deliver a message (character display or voice) reminding that the key inserted into the vehicle should be detached.

Figure 2:
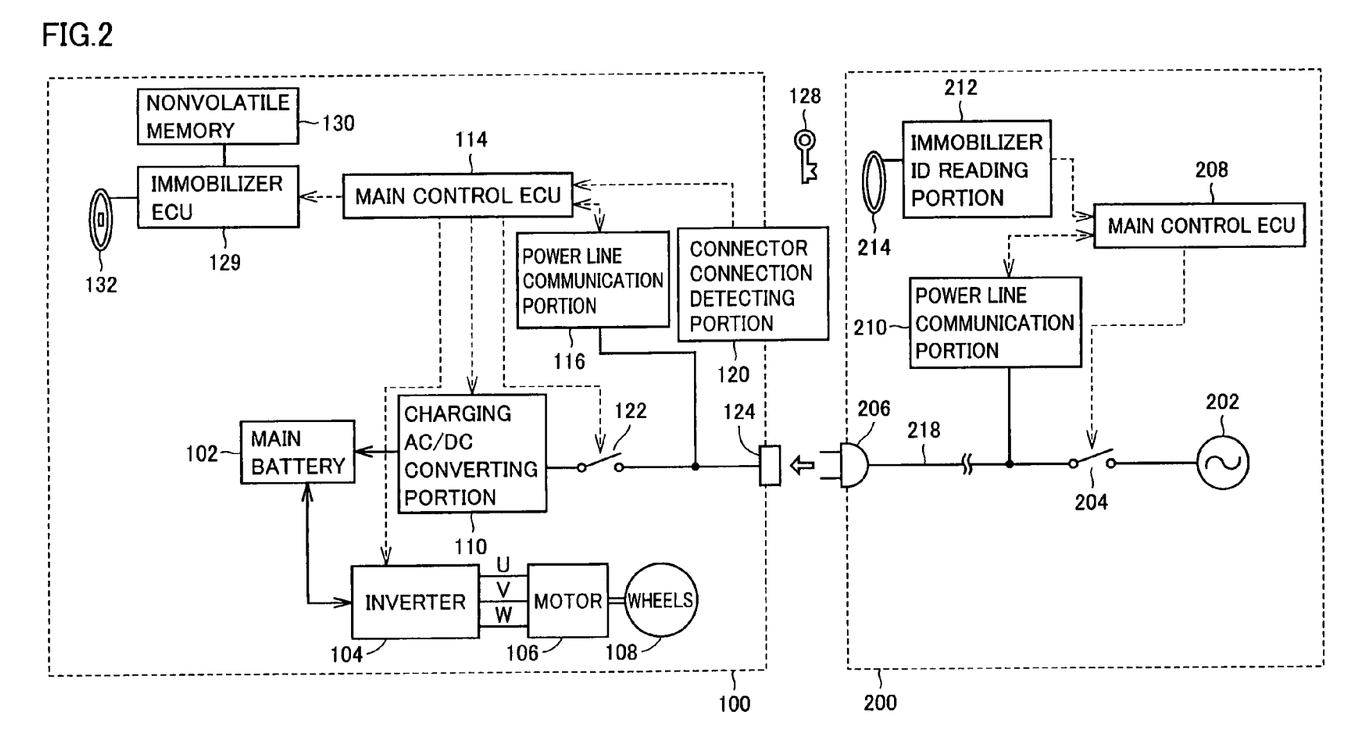
FIG. 2 is a block diagram more specifically showing structures of a vehicle and a charger.

FIG. 2 is a block diagram more specifically showing the structures of the vehicle and the charger.

With reference to FIGS. 1 and 2, vehicle 100 includes wheels 108, a motor 106 for driving wheels 108, an inverter 104 for providing three-phase AC electric power to motor 106, a main battery 102 for supplying DC electric power to inverter 104, and a main control ECU 114 for controlling inverter 104. Although vehicle 100 is an electric car, the invention can be also applied to a hybrid car or the like using a motor and an engine for driving.

Vehicle 100 includes a keyhole ring antenna 132, an immobilizer ECU 129, and a nonvolatile memory 130. Keyhole ring antenna 132 provided around a keyhole into which transponder key 128 is inserted can read the ID code of transponder key 128 by electromagnetic coupling without contact. Immobilizer ECU 129 reads the ID code stored in transponder key 128 owned by the owner of the vehicle as key information and permits main control ECU 114 to start the vehicle when the key information matches with registration information registered in advance in nonvolatile memory 130.

Vehicle 100 is formed so that main battery 102 can be charged from outside. In other words, vehicle 100 further includes a connector 124 provided with a terminal to which a commercial power such as AC 100 V is given from outside, a charging AC/DC converting portion 110 for converting the AC electric power given to connector 124 into DC electric power and giving it to main battery 102, a switch 122 for connecting connector 124 and charging AC/DC converting portion 110, a connector connection detecting portion 120 for detecting that a connector 206 of charger 200 is connected to connector 124, and a power line communication portion 116.

As another system structure of the vehicle that can be charged, motor driving inverter 104 may be used as a charging inverter. For example, a generator and a generator inverter may be further mounted so that electric power is supplied and received to and from a neutral point of stator coils of motor 106 and a neutral point of stator coils of the generator from and to the outside.

Main control ECU 114 monitors a state of charge (SOC) of main battery 102 and connector connection detecting portion 120 detects the connector connection. Main control ECU 114 brings switch 122 from an open state into a connecting state and causes charging AC/DC converting portion 110 to operate to charge main battery 102 if state of charge SOC is lower than a predetermined value when connector 206 is connected to connector 124.

Charger 200 includes: a power line communication portion 210 for receiving information such as state of charge SOC and a power feeding request from vehicle 100; a ring antenna 214; an immobilizer ID reading portion 212 for reading the ID code from transponder key 128 via ring antenna 214, transponder key 128 being the vehicle key of a user of charger 200 and connected to ring antenna 214; an AC power supply 202; a charging cable 218; connector 206 provided to an end portion of charging cable 218; a switch 204 for connecting AC power supply 202 to charging cable 218; and a main control ECU 208 for controlling opening and closing of switch 204.

Main control ECU 208 transmits the ID code to vehicle 100 via power line communication portion 210 when it receives the ID code from immobilizer ID reading portion 212. In vehicle 100, power line communication portion 116 receives the ID and an inquiry about authenticity of the ID is made to immobilizer ECU 129 via main control ECU 114. The immobilizer system is an antitheft system and the ID code is not stored in charger 200 for security reason. In the first embodiment, authentication is entrusted to vehicle 100.

Main control ECU 114 requests power feeding from charger 200 via power line communication portion 116 to charge main battery 102 when the ID is authentic. Alternatively, main control ECU 114 may inform charger 200 of state of charge SOC via power line communication portion 116 and charger 200 may decide to permit starting of power feeding based on state of charge SOC.

When main control ECU 114 receives a notification that the ID is authentic from the immobilizer ECU and when the ID is transmitted to main control ECU 114 from ring antenna 214 close to a keyhole, main control ECU 114 starts devices such as inverter 104 and motor 106 for causing the vehicle to travel. However, when the ID is transmitted via a route other than that, starting of the devices is prohibited. Main control ECU 114 also prohibits starting of the devices for causing the vehicle to travel when connector connection detecting portion 120 detects that charging cable 218 is connected. For example, as connector connection detecting portion 120, a sensor for detecting connection of the connector may be provided to a charging port of the vehicle. A magnet may be embedded in a part of connector 206 and a magnet sensor may detect proximity of the magnet. A switch that is pushed down by contact may be provided to connector 124 as a sensor. In this way, it is possible to prevent the vehicle to travel by mistake during charging or before the charging cable is detached from the vehicle.

Preferably, information based on which a person can be identified as a user of charger 200 may be recorded in nonvolatile memory 130 and the information may be transmitted to charger 200 via power line communication portion 116 in requesting to start power feeding. For example, if the ID code of the immobilizer system is ID1 and when ID1 is transmitted from charger 200 to vehicle 100, vehicle 100 returns a different ID2 to charger 200. ID2 is an ID code granted by a person who runs charger 200 to vehicle 100 and ID2 can be recorded in nonvolatile memory 130 of vehicle 100. ID2 may be stored in a storage device different from that for ID code of the immobilizer system and main control ECU 114 may read it out and transmit it to charger 200. In response, in charger 200, main control ECU 208 checks ID2 that is user identifying information received by power line communication portion 210 against information registered in memory in main control ECU 208 and opens or closes switch 204 according to information such as state of charge SOC and the request for power feeding if there is no problem with a check result. By using ID2, it is possible to integrate billing information for each user according to power feeding time and electric energy. If the memory in main control ECU 208 is rewritable, it is easy to address change of the contractor.

More preferably, charger 200 may include a credit cart reading portion. The credit card reading portion may read card information and a credit card company may get charged based on the credit card information when the vehicle returns ID2.

If ID2 is stored in advance in the charger and charging is permitted when ID2 is authenticated, it is possible to control the charger to charge only the predetermined vehicles without retaining ID1 of the immobilizer in the charger. In other words, there is an advantage that ID1 as highly confidential information need not be retained in the highly public charger. For example, this can be applied to a charger that is installed at an apartment house and can be used only by residents of the apartment house.

When vehicle 100 requests power feeding from charger 200, main control ECU 208 closes switch 204 to start power feeding and main control ECU 114 causes charging AC/DC converting portion 110 to operate to charge main battery 102.

When charging is completed, state of charge SOC of main battery 102 becomes higher than the predetermined value. In response, main control ECU 114 stops charging AC/DC converting portion 110 and brings switch 122 from the closed state into the open state. Then, stop of power feeding is requested of charger 200 via power line communication portion 116. As a result, main control ECU 208 brings switch 204 from the closed state into the open state.

In other words, charger 200 includes ring antenna 214 and immobilizer ID reading portion 212 forming a reading portion for reading the key information from transponder key 128 and switch 204 for starting supply of electric power to the vehicle according to an output of the reading portion. Preferably, the reading portion can read the key information when the key is at a predetermined or shorter reading distance (e.g., 20 cm or shorter) from the reading portion. The reading distance is such a distance that the key is at a predetermined or longer distance (e.g., 20 cm or longer) from keyhole ring antenna 132 of the vehicle and starting of the vehicle is not permitted. This condition is satisfied by adjusting sensitivity and output of keyhole ring antenna 132 so that starting of the vehicle is not permitted when the key is taken out of the vehicle and by adjusting sensitivity and output of ring antenna 214 so that the ring antenna 214 does not read the ID code when the key is in the vehicle interior.

The reading portion reads the key information from transponder key 128, communicates with immobilizer ECU 129 in the vehicle, and causes immobilizer ECU 129 to determine whether or not the key information is key information specific to the vehicle.

More preferably, main control ECU 114 returns to charger 200 permission information (ID2) indicating that vehicle 100 is permitted to use charger 200 when the key information is key information specific to the vehicle. Main control ECU 208 of charger 200 commands an electric power supply portion to start supply of electric power in response to the permission information.

Figure 3:
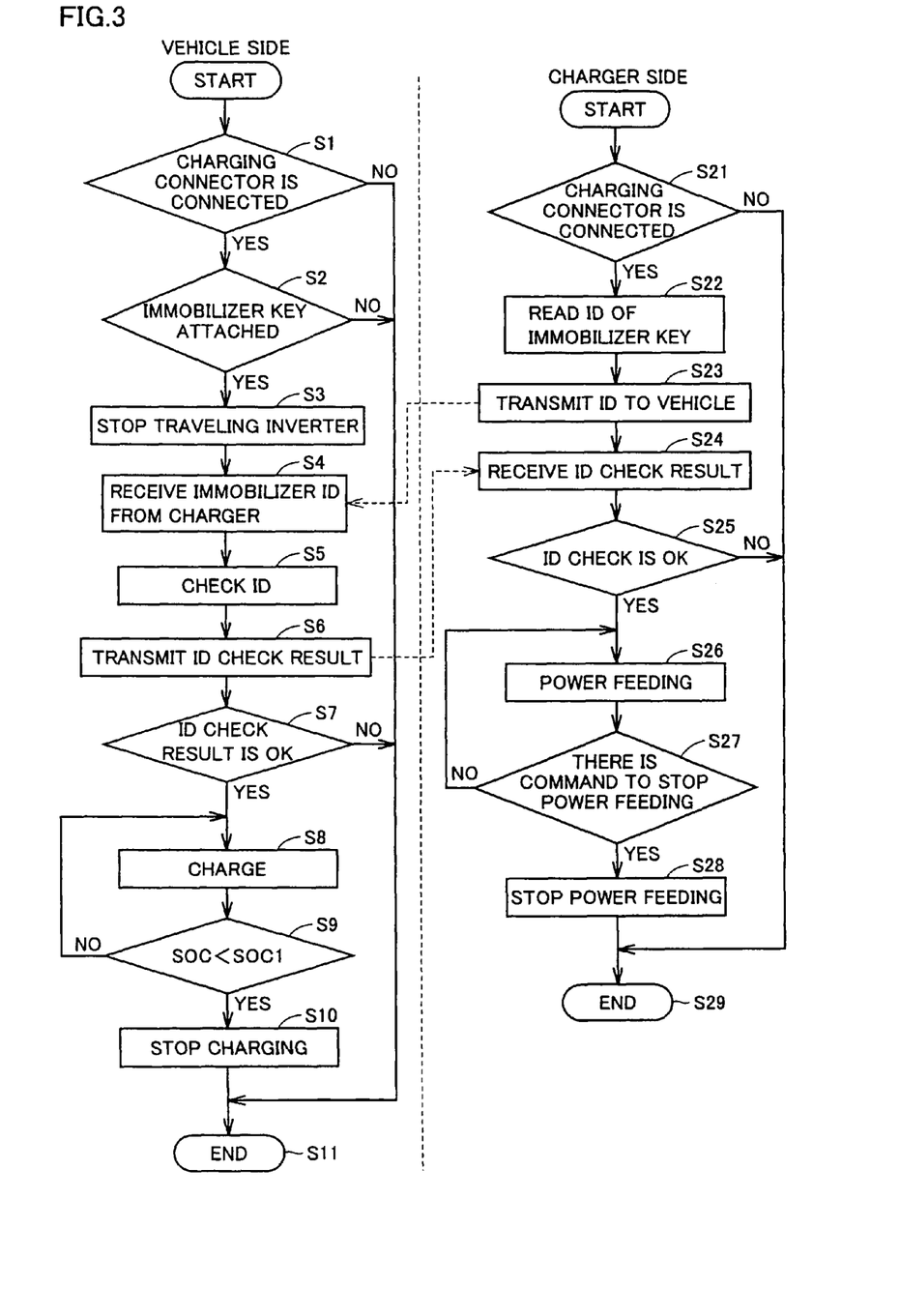
FIG. 3 shows flow charts of processing structures of control programs executed by the vehicle and the charger during charging.

FIG. 3 shows flow charts of processing structures of control programs executed by the vehicle and the charger during charging.

With reference to FIGS. 2 and 3, when the processing starts, in the vehicle, main control ECU 114 monitors output of connector connection detecting portion 120 and determines whether or not connector 206 is connected to connector 124 in step S1. Connector connection detecting portion 120 may be a switch that is brought into conduction when its protrusion is pushed down due to connection of the connector or may be a proximity sensor.

If the charging connector is not connected in step S1, the processing ends in step S11. If the charging connector is connected, on the other hand, the processing goes from step S1 to step S2.

In step S2, main control ECU 114 determines whether or not transponder key 128 of the immobilizer system is attached into the keyhole of the vehicle based on presence or absence of traveling permission from immobilizer ECU 129.

If transponder key 128 is attached into the keyhole of the vehicle in step S2, the processing goes to step S11 to end. On the other hand, if transponder key 128 is not attached into the keyhole of the vehicle, the processing goes to step S3.

In step S3, main control ECU 114 stops traveling inverter 104 to prevent the vehicle from traveling. At this time, wheels 108 may be mechanically locked by forcibly shifting a shift lever to a parking position or the like, for example.

Then, in step S4, main control ECU 114 receives the ID code of transponder key 128 sent from charger 200 via charging cable 218 and power line communication portion 116 and transmits the ID code to immobilizer ECU 129 to check the ID in step S5. The immobilizer system is the antitheft system, the ID code is preferably not stored in charger 200 for security reason, and vehicle 100 carries out authentication in the first embodiment.

Next, in step S6, main control ECU 114 obtains the check result of the ID code from immobilizer ECU 129 and returns the result to charger 200 via power line communication portion 116. If the ID is authentic and main battery 102 should be charged, main control ECU 114 requests power feeding from charger 200 via power line communication portion 116. Alternatively, main control ECU 114 may inform charger 200 of state of charge SOC via power line communication portion 116 and charger 200 may decide to start power feeding based on state of charge SOC. If the ID code does not match with that specific to vehicle 100, on the other hand, main control ECU 114 commands not to request power feeding from charger 200.

Preferably, information based on which a person can be identified as a user of charger 200 may be recorded in nonvolatile memory 130 and the information may be transmitted to charger 200 via power line communication portion 116 in requesting to start power feeding. For example, if the ID code of the immobilizer system is ID1 and when ID1 is transmitted from charger 200 to vehicle 100, vehicle 100 returns a different ID2 to charger 200. ID2 is the ID code granted by the person who runs charger 200 to vehicle 100 and ID2 can be recorded in nonvolatile memory 130 of vehicle 100. ID2 may be stored in the storage device different from that for ID code of the immobilizer system and main control ECU 114 may read it out and transmit it to charger 200.

In step S7, main control ECU 114 selects a branch of the processing based on the check result of the ID code.

If the ID code does not match with that specific to vehicle 100 as a result of the check of the ID code, the processing ends in step S11. On the other hand, if the ID code matches with that specific to vehicle 100, the processing goes to step S8.

In step S8, main control ECU 114 controls switch 122 to bring it into the closed state and causes charging AC/DC converting portion 110 to operate to convert the AC electric power given from outside into DC electric power to charge main battery 102.

During charging, main control ECU 114 determines whether or not the state of charge of main battery 102 is smaller than a predetermined threshold value SOC1 in step S9. If state of charge SOC is smaller than threshold value SOC1, determination that charging is required is made and the processing goes to step S8 to continue charging.

If state of charge SOC is greater than or equal to predetermined threshold value SOC in step S9, the processing goes to step S10. In step S10, main control ECU 114 stops charging AC/DC converting portion 110 and brings switch 122 into the open state to stop charging and the processing goes to step S11 to end. Preferably, main control ECU 114 may request stop of power feeding from charger 200 via power line communication portion 116 in step S10.

Next, processing performed in charger 200 will be described. With reference to FIGS. 1 and 3, if the processing starts, whether or not charging connector 206 is connected to connector 124 of the vehicle is determined in step S21. At this time, result of recognition by connector connection detecting portion 120 in vehicle 100 may be obtained and determined by main control ECU 208 via power line communication portion 210. Alternatively, connector 206 may be provided with a connection detecting means for detecting connection such as a switch that is brought into conduction when its protrusion is pushed down and main control ECU 208 may make determination that the connector is connected by using the means.

If the charging connector is not connected, the processing ends in step S29. If determination that the charging connector is connected is made, the processing goes to step S22.

Main control ECU 208 receives the ID code of transponder key 128 from immobilizer ID reading portion 212 in step S22 and then transmits the ID code to vehicle 100 via power line communication portion 210 in step S23 to wait the check result from vehicle 100.

In step S24, main control ECU 208 receives the check result of the ID code checked in vehicle 100 via power line communication portion 210. Main control ECU 114 in the vehicle requests power feeding from charger 200 via power line communication portion 116 if the ID is authentic and main battery 102 should be charged. Alternatively, main control ECU 114 informs charger 200 of state of charge SOC via power line communication portion 116. Charger 200 determines to start power feeding in step S25 based on the transmitted request for power feeding or state of charge SOC.

Preferably, vehicle 100 may return to charger 200 ID2 that is the user identifying information and main control ECU 208 may check ID2 against the information received by power line communication portion 210 and registered in the inside memory and carry out power feeding if there is no problem with the check result.

If there is a problem with the check result of the ID in step S25, the processing ends in step S29. On the other hand, it there is no problem with the ID check result, the processing goes to step S26 where power feeding to vehicle 100 is carried out. In step S26, main control ECU 208 closes switch 204 to connect power supply 202 and charging cable 218 to carry out power feeding to vehicle 100.

Following step S26, if there is a command to stop power feeding is checked periodically in step S27. The command to stop power feeding may be issued by operating a switch provided on a control panel of the charger or may be issued by vehicle 100 by means of power line communication when charging is completed.

If there is no command to stop power feeding in step S27, the processing returns to step S26 to continue power feeding to vehicle 100. On the other hand, if there is the command to stop power feeding in step S27, switch 204 is controlled into the open state to stop power feeding to vehicle 100 in step S28 and the processing ends in step S29.

As described above, according to the first embodiment, it is possible to avoid unexpectedly coming in contact with the live plug. It is also possible to avoid unexpected movement of the vehicle when charging starts. Furthermore, there is a security advantage, because the ID code of the immobilizer is not stored in the charger.

Second Embodiment

In the first embodiment, by communication of the ID code of the immobilizer between the vehicle and the charger, the ID code read by the charger is checked against vehicle 100. However, the communication of the ID code and the check in vehicle 100 are not necessarily required.

Figure 4:
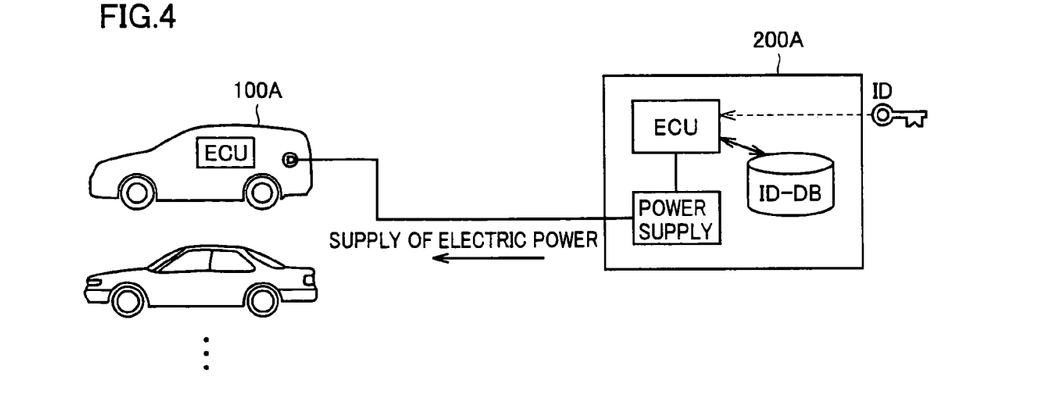
FIG. 4 is a drawing showing a variation of the charger and the vehicle shown in FIG. 1.

FIG. 4 is a drawing showing a variation of the charger and the vehicle shown in FIG. 1.

With reference to FIG. 4, in this variation, in addition to the structure of charger 200 described in the first embodiment, a charger 200A further includes an ID database in which an ID code of an immobilizer system of a vehicle permitted to use the charger is registered.

When a control ECU of charger 200A reads the ID code from a transponder key, it checks the ID code against the ID database. If the ID code is one of the registrant, supply of the electric power is started. In this case, the ID code is not checked in a vehicle 100A.

If charger 200A holds the ID code and billing information in correspondence with each other, it is possible to individually bill the users.

Figure 5:
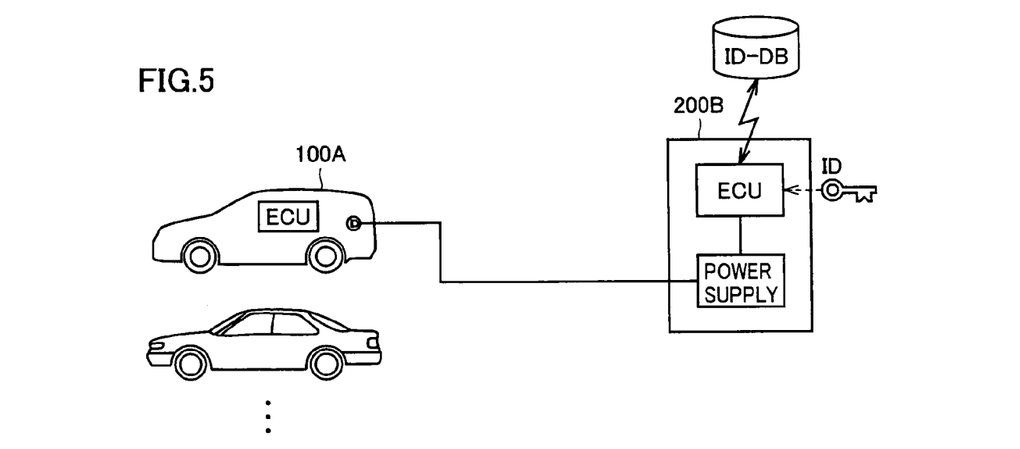
FIG. 5 is a drawing showing a variation of the charger and the vehicle shown in FIG. 4.

FIG. 5 is a drawing showing a variation of FIG. 4.

In FIG. 5, a charger 200B makes an inquiry about a match of an ID of a transponder key and an ID of a registered user with each other to an ID database provided outside by means of communication.

Charger 200B is normally installed in a place such as a parking lot accessed by the general public. Therefore, by disposing the ID database in a different place where it can be controlled strictly, it is possible to decrease a possibility of a leak of the ID code of the immobilizer system.

As described above, in the present embodiment, it is possible to prevent an operator from unexpectedly coming in contact with the live plug at the tip end of the charging cable in attaching the power cable to the vehicle. Moreover, it is possible to prevent unexpected movement of the vehicle during charging operation.

Although use of the transponder key formed by integrating a key to be inserted into the keyhole with a transponder has been described in the present embodiment, the key to be inserted into the keyhole and the transponder are not necessarily integrated with each other. For example, the transponder may be mounted to a key ring or a pendant.

In FIG. 2 in the present embodiment, the electric car having the motor for driving the wheels is shown as an example of the car that can be charged. However, the invention can be also applied to a series/parallel-type hybrid car in which a power split device splits power of an engine between axles and a generator and a series-type hybrid car in which an engine is used only for driving a generator and only a motor using electric power generated by the generator generates driving force for axles. A battery of each of the structures may be charged from outside and the invention can be applied to them.

Furthermore, if the vehicle can supply electric power to the outside, it is possible to apply the invention of the present application to a case of supplying the electric power to an electric device including electric load outside the vehicle instead of power supply 202 in FIG. 2. In this case, DC electric power of main battery 102 is converted into AC electric power by AC/DC converting portion 110 and supplied to the outside. Especially, a hybrid car mounted with a generator driven by an engine in addition to main battery 102 can be used as an emergency power supply in a time of disaster.

In addition to supply of the AC electric power to the outside of the car and being charged by receiving the AC electric power as described above, supply of DC electric power to the outside of the car and being charged by receiving the DC electric power are also conceivable. In this case, a DC/DC converting portion for boosting or stepping down DC voltage may be mounted to the vehicle instead of AC/DC converting portion 110 in FIG. 2 and a DC power supply or a DC load may be mounted to the electric device outside the vehicle instead of AC power supply 202.

The embodiments disclosed this time are examples in all points and should not be considered restrictive. The scope of the invention is not defined in the above description but is defined in claims and includes meanings equivalent to the claims and all modifications in the scope of claims.

The invention claimed is:

1. A vehicle comprising:
    an electric storage device;
    an electric power converter for supplying and receiving electric power to and from said electric storage device;
    a connecting portion for connecting an electric apparatus outside the vehicle and said electric power converter; and
    an electronic control device for reading key information stored in a vehicle key and permitting starting of said vehicle when said key information matches with registration information registered in advance in said vehicle,
    wherein said electronic control device includes
    a controller for controlling said electric power converter so that the converter receives said key information from said electric apparatus and supplies and receives the electric power to and from said electric storage device when said key information matches with said registration information.

2. The vehicle according to claim 1, further comprising a transmitting portion for transmitting an authentication result to said electric apparatus when said key information matches with said registration information.

3. The vehicle according to claim 1, wherein said electronic control device receives said key information via a route different from a power distribution route for supplying and receiving the electric power between said electric apparatus and said electric power converter and prohibits supply or reception of the electric power to and from said electric storage device when said key information matches with said registration information.

4. The vehicle according to claim 1, wherein said electronic control device receives said key information via a power distribution route for supplying and receiving the electric power between said electric apparatus and said electric power converter and prohibits starting of said vehicle when said key information matches with said registration information.

5. The vehicle according to claim 1,
    wherein said registration information is information specific to said vehicle and
    said electronic control device returns to said electric apparatus permission information indicating that said vehicle is a car permitted to use said electric apparatus when said key information matches with said registration information.

6. An electric apparatus for supplying and receiving electric power to and from an electric storage device mounted to a vehicle, the electric apparatus being outside the vehicle and including an electronic control device for reading key information stored in a vehicle key and permitting starting of said vehicle when said key information matches with registration information registered in advance in the vehicle,
    the electric apparatus comprising:
    a reading portion for reading said key information from said vehicle key,
    an electric power supplying and receiving portion for supplying or receiving the electric power to and from said electric storage device according to said key information read by said reading portion,
    a transmitting portion for transmitting said key information to said vehicle when said reading portion reads said key information, and
    a receiving portion for receiving a signal indicating whether or not said key information matches with the registration information registered in advance in said vehicle from said electronic control device.

7. The electric apparatus according to claim 6, further comprising a control portion for permitting supply or reception of the electric power to or from said electric storage device when said receiving portion receives the signal indicating that said key information matches with said registration information.

8. The electric apparatus according to claim 6, further comprising a control portion for storing permission information issued to vehicles permitted to use said electric apparatus and determining whether or not the information transmitted from said electronic control device matches with said permission information when said key information matches with the registration information registered in advance in said vehicle,
   wherein said control portion permits supply or reception of the electric power to or from said electric storage device when said information transmitted from said electronic control device matches with said permission information.

9. The electric apparatus according to claim 7, further comprising a storage device for storing vehicle owner information,
   wherein said signal includes said vehicle owner information and
   said control portion permits supply or reception of the electric power to and from said electric storage device when said vehicle owner information stored in said storage device matches with the vehicle owner information included in said signal.

10. The electric apparatus according to claim 6, further comprising a power line cable for supplying or receiving the electric power to and from said electric storage device,
    wherein said transmitting portion and said receiving portion transmits and receives said signal to and from said vehicle through said power line cable.

11. The electric apparatus according to claim 7, further comprising a power line cable for supplying or receiving the electric power to and from said electric storage device,
    wherein said transmitting portion and said receiving portion transmits and receives said signal to and from said vehicle through said power line cable.

12. The electric apparatus according to claim 8, further comprising a power line cable for supplying or receiving the electric power to and from said electric storage device,
    wherein said transmitting portion and said receiving portion transmits and receives said signal to and from said vehicle through said power line cable.

13. The electric apparatus according to claim 9, further comprising a power line cable for supplying or receiving the electric power to and from said electric storage device,
    wherein said transmitting portion and said receiving portion transmits and receives said signal to and from said vehicle through said power line cable.

* * * * *